US006942049B2

(12) United States Patent
Shimizu

(10) Patent No.: US 6,942,049 B2
(45) Date of Patent: Sep. 13, 2005

(54) IN-WHEEL MOTOR FOR ELECTRIC AUTOMOBILES

(75) Inventor: Hiroshi Shimizu, Kanagawa (JP)

(73) Assignee: Japan Science and Technology Corporation, Kawaguchi (JP)

( * ) Notice: Subject to any disclaimer, the term of this patent is extended or adjusted under 35 U.S.C. 154(b) by 325 days.

(21) Appl. No.: 10/239,876

(22) PCT Filed: Dec. 26, 2001

(86) PCT No.: PCT/JP01/11434

§ 371 (c)(1),
(2), (4) Date: Oct. 4, 2002

(87) PCT Pub. No.: WO02/066280

PCT Pub. Date: Aug. 29, 2002

(65) Prior Publication Data

US 2004/0080223 A1 Apr. 29, 2004

(30) Foreign Application Priority Data

Feb. 19, 2001 (JP) .................................... 2001-041698

(51) Int. Cl.[7] ................................................ B60K 7/00
(52) U.S. Cl. ........................ 180/65.6; 180/253; 310/83
(58) Field of Search ............................. 180/65.5, 65.6, 180/253; 475/149; 310/83

(56) References Cited

U.S. PATENT DOCUMENTS

| | | | | |
|---|---|---|---|---|
| 3,462,667 A | * | 8/1969 | Jackson ...................... | 318/696 |
| 4,571,822 A | * | 2/1986 | Saito et al. .................... | 29/736 |
| 4,798,260 A | * | 1/1989 | Nakata et al. ............... | 180/253 |
| 5,087,229 A | * | 2/1992 | Hewko et al. ............... | 475/149 |
| 5,156,579 A | * | 10/1992 | Wakuta et al. ............... | 475/161 |
| 5,163,528 A | * | 11/1992 | Kawamoto et al. ......... | 180/65.5 |
| 5,180,180 A | * | 1/1993 | Yamashita et al. .......... | 180/253 |
| 5,382,854 A | * | 1/1995 | Kawamoto et al. ........ | 310/67 R |
| 6,148,945 A | * | 11/2000 | Alessandro et al. ......... | 180/256 |
| 6,225,775 B1 | * | 5/2001 | Alvaro et al. ................ | 318/727 |

FOREIGN PATENT DOCUMENTS

| | | | |
|---|---|---|---|
| JP | 05-116545 | * | 5/1993 |
| JP | 05-116546 | * | 5/1993 |
| JP | 8-81430 | | 3/1995 |
| JP | 11-89178 | | 3/1999 |
| JP | 11-115507 | | 4/1999 |
| JP | 11-170831 | | 6/1999 |
| JP | 2000-52788 | | 2/2000 |

* cited by examiner

Primary Examiner—Christopher Bottorff
(74) Attorney, Agent, or Firm—Oblon, Spivak, McClelland, Maier & Neustadt, P.C.

(57) ABSTRACT

The present invention provides an in-wheel motor for an electric vehicle allowing a drive motor to be freely mounted onto a chassis irrespective of the shape, structure, and characteristics of the drive motor as well as allowing free selection of a reduction gear ratio without need to replace a drive motor.

An in-wheel motor for an electric vehicle includes a drive motor (1200), a reduction gear mechanism (1300), a wheel bearing, and a mechanical brake and serves as a drive apparatus for an electric vehicle. The drive motor (1200) includes a casing (1210) which houses a rotor (1240) and a stator (1220); the reduction gear mechanism (1300) is implemented by a planetary gear mechanism; a wheel bearing is fixedly attached to the outer circumference of an end portion of a housing (1411), which houses a wheel shaft (1410) coupled to an output element of the planetary gear mechanism; mounting blocks (800, 810) having engagement means are provided respectively at upper and lower outside portions of the casing (1210); and attachments are attached to the corresponding mounting blocks (800, 810) and joined to corresponding joint mechanisms (612, 712), which are movably coupled to a suspension mechanism.

12 Claims, 5 Drawing Sheets

IN-WHEEL MOTOR FOR ELECTRIC AUTOMOBILES

TECHNICAL FIELD

The present invention relates to an in-wheel motor to be mounted in an electric vehicle and, more particularly, to an in-wheel motor for an electric vehicle devised to be freely mountable regardless of the shape, structure, and characteristics of a drive motor thereof.

BACKGROUND ART

Conventional in-wheel motors for electric vehicles consist of those described below.

FIG. 1 is a sectional view showing the structure of a conventional in-wheel motor for an electric vehicle.

FIG. 1 shows an in-wheel motor that is configured such that the casing of a motor, which partially constitutes a drive mechanism, includes mounting means. In this electric vehicle, a drive mechanism 100 is integrally incorporated into a driving wheel (in-wheel-motor type). The drive mechanism 100 is configured such that a drive motor 200, a reduction gear mechanism 300, and a brake 400 are integrated into a unit mechanism. A tire 500 is mounted on the unit mechanism.

The drive motor 200 is a permanent-magnet-type AC motor. A casing 210 of the drive motor 200 is composed of an outer frame 211, an inner frame 212, an end ring 213, and an end plate 214. The outer frame 211 is cylindrical and includes a bracket portion 211a, which is located towards the right in FIG. 1. The inner frame 212 is a cylindrical member that is concentrically disposed within the outer frame 211, and includes a bracket portion 212a, which is located at the right end in FIG. 1.

The bracket portion 211a and the bracket portion 212a are joined via bolts, whereby the outer frame 211 and the inner frame 212 are joined. The end ring 213 and the end plate 214 are attached via bolts to the left end face of the outer frame 211.

A stator 220, which includes a stator core 221 and a coil 222, is mounted on the inner circumferential surface of the outer frame 211. A cylindrical rotor 240 is rotatably mounted on the outer circumferential surface of the inner frame 212 via a motor bearing 230.

The rotor 240 includes a rotor core 241 and a permanent magnet 242. A rotary block 250 is attached to the rotor core 241 via bolts. A revolution speed detector 260 is attached to the left-hand end of the rotary block 250. A shaft 270 is serration-coupled to a right-hand portion of the rotary block 250. AC current is supplied to the coil 222 of the drive motor 200 through a cable 280. A revolution speed signal indicative of revolution speed detected by the revolution speed detector 260 is output through a cable 281.

Support rings 290 and 291 formed in the outer frame 211 are fitted to corresponding fulcrums of a suspension mechanism, whereby the drive mechanism 100 is mounted onto a chassis of the electric vehicle.

The reduction gear mechanism 300 is a planetary gear mechanism and is adapted to transmit rotation of the shaft 270 to a wheel shaft 410 after reduction of speed. In this case, a carrier 301 of the reduction gear mechanism 300 is serration-coupled to the wheel shaft 410 so as to transmit torque to the wheel shaft 410 while being allowed to move axially.

A wheel shaft tube 411, through which the wheel shaft 410 extends, is fixedly attached to the bracket portions 211a and 212a. The reduction gear mechanism 300 is disposed in a space that is enclosed by the wheel shaft tube 411 and the bracket portion 212a of the inner frame 212. A ring gear 302 of a planetary gear is formed on the inner surface of the inner frame 212. An end face of the shaft 270 and an end face of the wheel shaft 410 are pivoted by means of a pivot 412. The brake 400 is a hydraulic brake that uses a drum.

A wheel hub 420 is attached to the wheel shaft 410 via bolts. A brake drum 430 and a disk wheel 505 of a wheel are attached to the wheel hub 420 via bolts. A hub bearing 440, which serves as a wheel bearing, is interposed between the wheel shaft tube 411 and the wheel hub 420. A back plate of the brake 400 is fixedly attached to a flange portion of the wheel shaft tube 411. When hydraulic pressure increases as a result of a brake pedal being stepped on, a wheel cylinder 401 causes brake shoes 402 to be expanded, so that the brake shoes 402 come into contact with the brake drum 430 for braking.

The tire 500 is mounted on a rim 510 of the disk wheel 505. In the thus-configured drive mechanism 100, when the motor 200 is activated to thereby rotate the rotor 240, rotation of the rotor 240 is transmitted to the rotary block 250 and the shaft 270 and is then speed-reduced at the reduction gear mechanism 300. The speed-reduced rotation is transmitted to the wheel shaft 410. Thus, the tire 500 coupled to the wheel shaft 410 is rotated, whereby the electric vehicle moves.

FIG. 2 is a modified version of the drive mechanism 100 shown in FIG. 1. For application to a small-diameter tire 500, this modified drive mechanism employs a drive motor 200 having a long axial dimension and a short radial dimension. Since the drive motor 200 has a short radial dimension, centrifugal force induced by the rotor 240 is small, and thus the drive motor 200 can be a high-speed motor.

Therefore, the reduction gear mechanism 300 is designed to provide a large reduction gear ratio; thus, the outside diameter of the reduction gear mechanism 300 is greater than the inside diameter of the stator 220. Also in this embodiment, the ring gear 302 of the reduction gear mechanism 300 is formed on the inner surface of the inner frame 212.

Still another drive mechanism is disclosed in U.S. Pat. No. 5,087,229. This drive mechanism includes a drive motor, a reduction gearset, a brake, and a tire as well as a steering knuckle, a ball joint mechanism, etc. which are provided integrally with a motor wheel for supporting the motor wheel.

In FIG. 3, reference numeral 10 denotes a motor wheel; reference numeral 12 denotes a steering knuckle; reference numeral 14 denotes a ball joint mechanism; reference numeral 16 denotes a motor wheel support element; reference numeral 18 denotes a vehicle shock tower; reference numeral 20 denotes a frame member; reference numeral 22 denotes bolts; reference numeral 24 denotes a mounting clamp; reference numeral 26 denotes a McPherson assembly; reference numeral 28 denotes a plate; reference numeral 30 denotes a nut; reference numeral 32 denotes a lower control arm; reference numeral 34 denotes a sway bar; reference numeral 36 denotes a ball joint mechanism; reference numeral 38 denotes a link; reference numeral 40 denotes a hub; reference numeral 42 denotes bolts; reference numeral 44 denotes a motor housing; reference numeral 46 denotes bolts; reference numeral 48 denotes a housing of a planetary reduction gearset assembly; reference numeral 49 denotes a gearset; reference numeral 50 denotes bolts;

reference numeral 51 denotes a steering tie rod attached to the steering knuckle 12; reference numeral 52 denotes a hub bearing element; reference numerals 53 and 54 denote bearings; reference numeral 58 denotes a disk rotor; reference numeral 60 denotes a disk wheel; reference numeral 62 denotes lug nuts; reference numeral 64 denotes a tire; reference numeral 66 denotes a valve; reference numeral 68 denotes a caliper; reference numeral 72 denotes pads; reference numeral 76 denotes cooling fins; reference numeral 80 denotes a stator; reference numeral 82 denotes a coil; reference numeral 84 denotes lead-in conductors; reference numeral 86 denotes a connector; reference numeral 88 denotes a cable; reference numeral 90 denotes a driving shaft; reference numeral 91 denotes a washer; reference numeral 92 denotes a hub nut; reference numeral 93 denotes a rotor; reference numeral 94 denotes a rotor; reference numeral 95 denotes magnets; and reference numeral 96 denotes a rotation detector.

DISCLOSURE OF THE INVENTION

In the conventional motors shown in FIGS. 1 and 2, the support rings 290 and 291, which are used for mounting the motors onto respective chassis, are formed integrally with the casing 210. Required motor characteristics, such as low speed or high speed, or low torque or high torque, depend on the size of a tire and vehicle characteristics. The size and shape of a motor vary depending on the required motor characteristics. Thus, the positions of the support rings 290 and 291, which are used for mounting the motor onto a chassis, vary accordingly in relation to the casing 210 and to the tire 500.

Thus, when existing in-wheel motors designed for certain vehicles are to be applied to another vehicle, an applicable in-wheel motor is limited to that having a specific mounting section; i.e., a mounting section that satisfies a specific positional relation between the mounting section and a wheel. Also, when an in-wheel motor of a certain tire is to be applied to a tire of a different diameter or when a certain in-wheel motor is to be replaced with an in-wheel motor of different motor characteristics, the desired application or replacement may be infeasible if the positions of the support rings 290 and 291 are incompatible. Further, as is apparent from the above-described conventional motors, the axial length of a motor casing changes depending on motor characteristics, and the position of the mounting section changes accordingly.

Therefore, an in-wheel motor has been selected according to the position of a mounting section, not according to motor characteristics, thereby narrowing the range of selection and thus raising difficulty in design and affecting convenience of use.

When the revolution speed of a wheel and a driving torque are to be changed without changing motor output, reduction gear ratio must be changed. In this case, a conventional motor does not allow replacement of a reduction gear only, but requires replacement of an entire motor.

An object of the present invention is to solve the above-mentioned problems in a conventional in-wheel motor and to provide an in-wheel motor for an electric vehicle allowing a drive motor to be freely mounted onto a chassis irrespective of the shape, structure, and characteristics of the drive motor as well as allowing free selection of a reduction gear ratio without need to replace a drive motor.

To achieve the above object, the present invention provides the following in-wheel motors for an electric vehicle.

[1] An in-wheel motor for an electric vehicle comprises a drive motor, a reduction gear mechanism, a wheel bearing, and a mechanical brake and serves as a drive apparatus for an electric vehicle. The in-wheel motor is characterized in that the drive motor includes a casing which houses a rotor and a stator; the reduction gear mechanism comprises a planetary gear mechanism; a wheel bearing is fixedly attached to the outer circumference of an end portion of a housing, which houses a wheel shaft coupled to an output element of the planetary gear mechanism; mounting blocks having engagement means are provided respectively at upper and lower outside portions of the casing; and attachments are attached to the corresponding mounting blocks and joined to corresponding joint mechanisms, which are movably coupled to a suspension mechanism.

[2] In the in-wheel motor for an electric vehicle as described above in [1], the attachments are characterized in that a line connecting the centers of rotation of the joint mechanisms, which are fixedly attached to the corresponding attachments, forms a king pin angle with respect to the center axis of a wheel.

[3] In the in-wheel motor for an electric vehicle as described above in [1], a steering tie rod is coupled to either of the attachments.

[4] An in-wheel motor for an electric vehicle comprises a drive motor, a reduction gear mechanism, a wheel bearing, and a mechanical brake and serves as a drive apparatus for an electric vehicle. The in-wheel motor is characterized in that the drive motor includes a casing which houses a rotor and a stator; the reduction gear mechanism comprises a planetary gear mechanism; a wheel bearing is fixedly attached to the outer circumference of an end portion of a housing, which houses a wheel shaft coupled to an output element of the planetary gear mechanism; the mechanical brake is a drum brake or a disk brake; the planetary gear mechanism is housed within the housing, and an input shaft of the planetary gear mechanism is spline-coupled to a rotary shaft of the drive motor; and the housing is attached to the casing via bolts.

[5] In the in-wheel motor for an electric vehicle as described above in [4], the planetary gear mechanism is configured such that a partition is provided within a gear chamber for controlling stirring of lubrication oil.

[6] In the in-wheel motor for an electric vehicle as described above in [1] or [4], a rotational-position detector is disposed on the side of the rotor opposite the output side of the rotor, and the rotational-position detector is a resolver.

[7] In the in-wheel motor for an electric vehicle as described above in [1] or [4], the drive motor is a 6-phase synchronous AC motor.

[8] In the in-wheel motor for an electric vehicle as described above in [1] or [4], coil ends of an armature, which partially constitutes the stator, are mechanically compressed from axially opposite sides.

[9] In the in-wheel motor for an electric vehicle as described above in [1] or [4], the joint mechanism is a ball joint mechanism or a spherical joint mechanism.

As mentioned above, the configuration of the present invention is characterized in that means for mounting an in-wheel motor comprises the mounting blocks provided on the casing of the in-wheel motor; the joint mechanisms, which are movably coupled to a suspension mechanism; and the attachments, which are attached to the corresponding mounting blocks and joined to the corresponding joint mechanisms.

The configuration of the present invention is characterized in that means for attaching the above-mentioned attachments to the mounting blocks is in common among various attachments and that other specifications of the attachments are modified as appropriate so as to be compatible with various applications.

The configuration of the present invention is characterized in that the above-mentioned mounting blocks are provided respectively at an upper portion and a lower portion of the casing and that the above-mentioned attachments are provided in correspondence with the mounting blocks.

The configuration of the present invention is characterized in that means for mounting an in-wheel motor comprises a mounting block provided on an upper portion of the casing; a support portion of an upper arm, which partially constitutes the attachment, the support portion being coupled to a joint mechanism; a mounting block provided on a lower portion of the casing; and a support portion of a lower arm, which partially constitutes the attachment, the support portion being coupled to a joint mechanism.

The configuration of the present invention is characterized in that the coupling surface of each mounting block and the coupling surface of a coupling portion of each arm, which partially constitutes the attachment, can abut each other at any mounting angle.

The configuration of the present invention is characterized in that the planetary gear mechanism is housed within the housing while a ring gear is provided on the inner surface of the housing; the input shaft of the planetary gear mechanism is spline-coupled to the rotary shaft of the drive motor; and the housing is attached to the casing via bolts.

The configuration of the present invention is characterized in that the partition for controlling stirring of lubrication oil is provided between the end face of the planetary gear mechanism and a bracket portion of the motor casing.

According to the present invention, only the upper and lower mounting blocks are formed on an in-wheel motor body such that coupling surfaces of the blocks are common among different types of vehicles. While coupling specifications are common among various upper arms and among various lower arms, other specifications of the upper and lower arms are modified according to, for example, mounting length and mounting height, whereby the mounting blocks are coupled to a suspension mechanism by means of the upper and lower arms. A steering tie rod is coupled to either the upper arm or the lower arm.

Conventional motor mounting means is integral with a motor casing; thus, mounting position, mounting height, etc. are fixed. Therefore, replacement with a drive motor of a different type is difficult unless the replacing drive motor has the same mounting dimensions as those of a drive motor to be replaced. By contrast, according to the present invention, the attachment and the casing are discrete members. Therefore, even when a replacing drive motor is of a different type, the replacing drive motor can be mounted by means of changing attachments.

Through change in the gear ratio of the planetary gear mechanism of the reduction gear mechanism, revolution speed of a wheel and driving torque can be changed without need to replace a drive motor.

BEST MODE FOR CARRYING OUT THE INVENTION

Modes for carrying out the present invention will next be described with reference to the drawings.

Embodiments of the present invention will next be described with reference to the following drawings.

Figure 1:
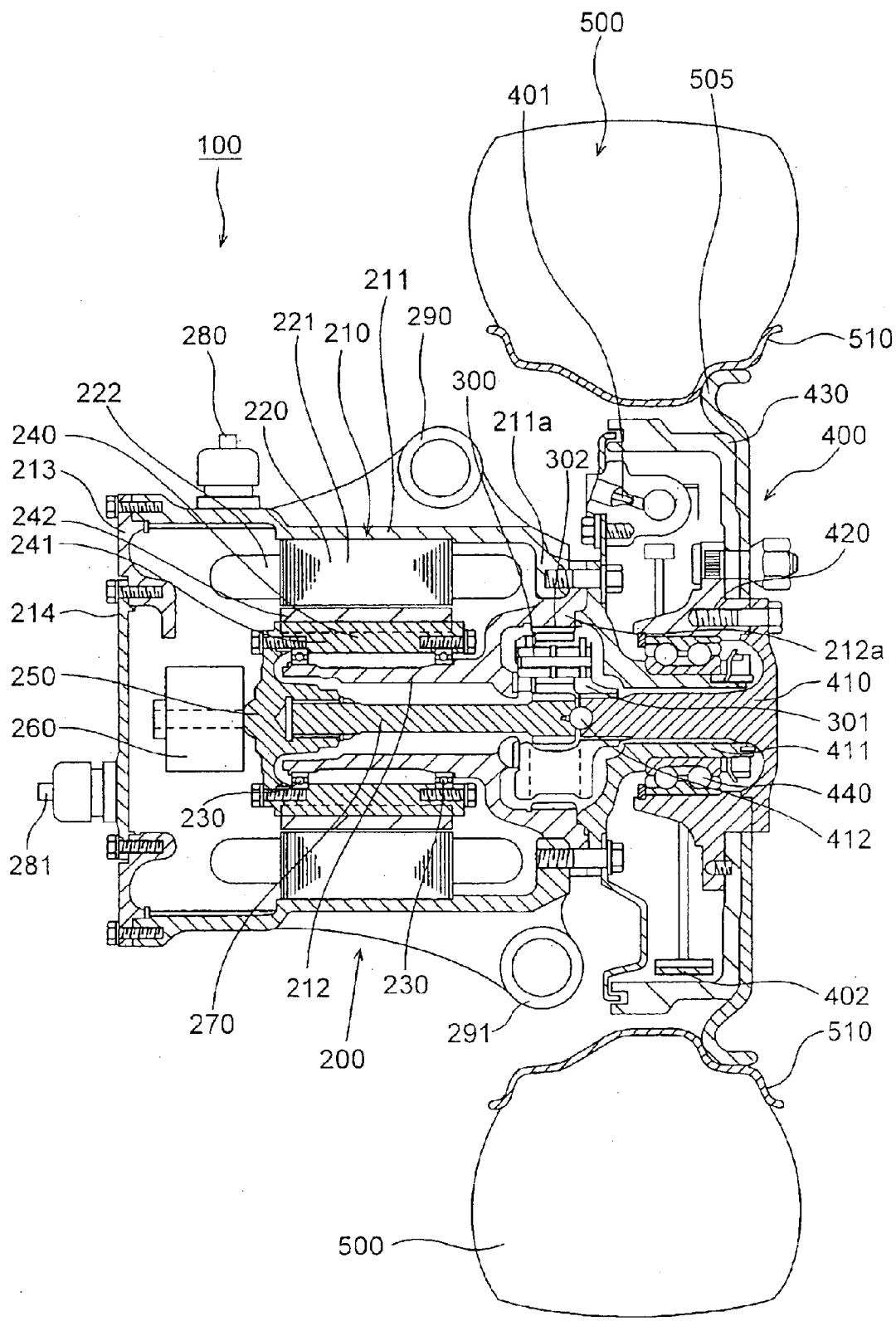
FIG. 1 is a longitudinal sectional view of a conventional in-wheel motor for an electric vehicle.
Figure 2:
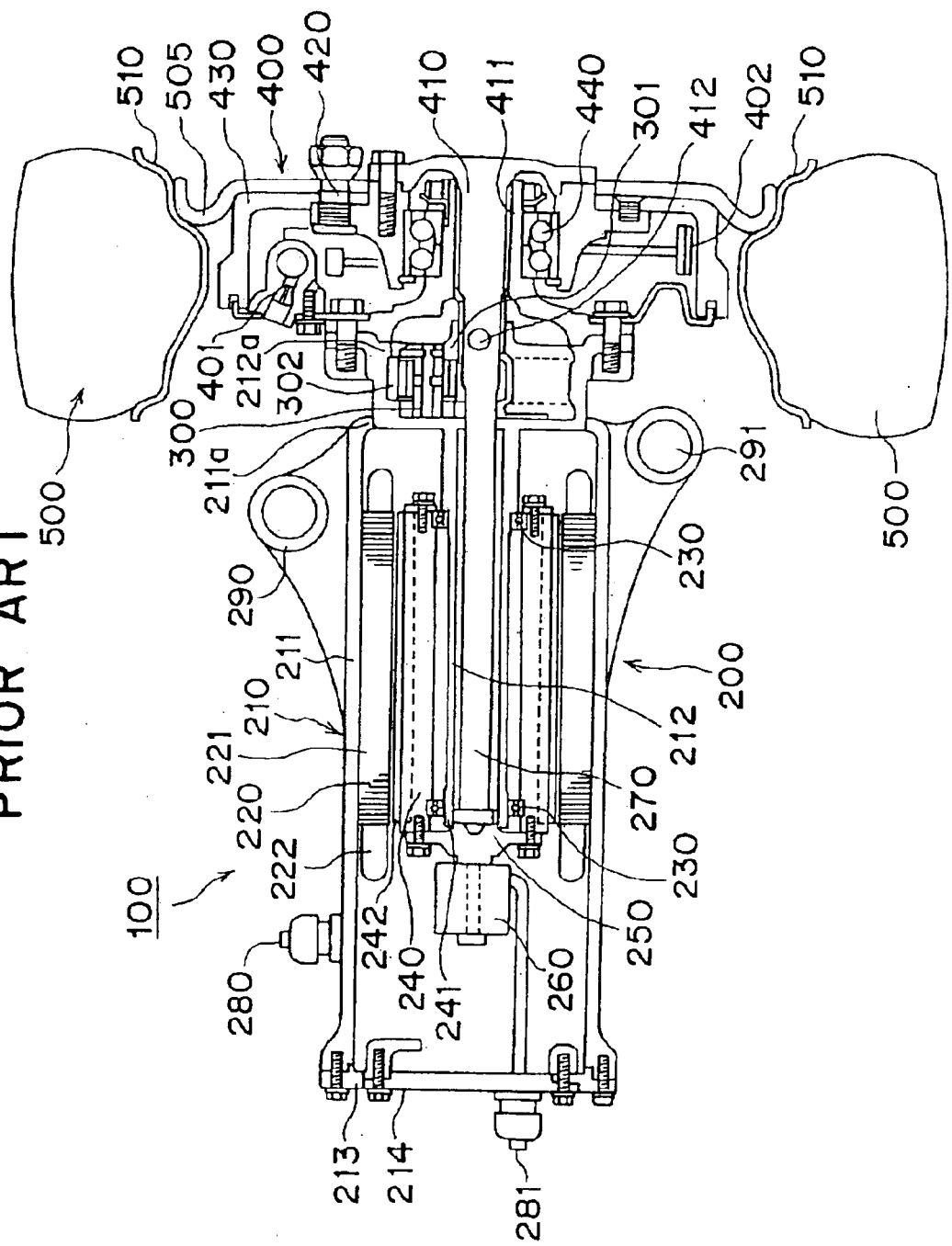
FIG. 2 is a longitudinal sectional view of another conventional in-wheel motor for an electric vehicle.
Figure 3:
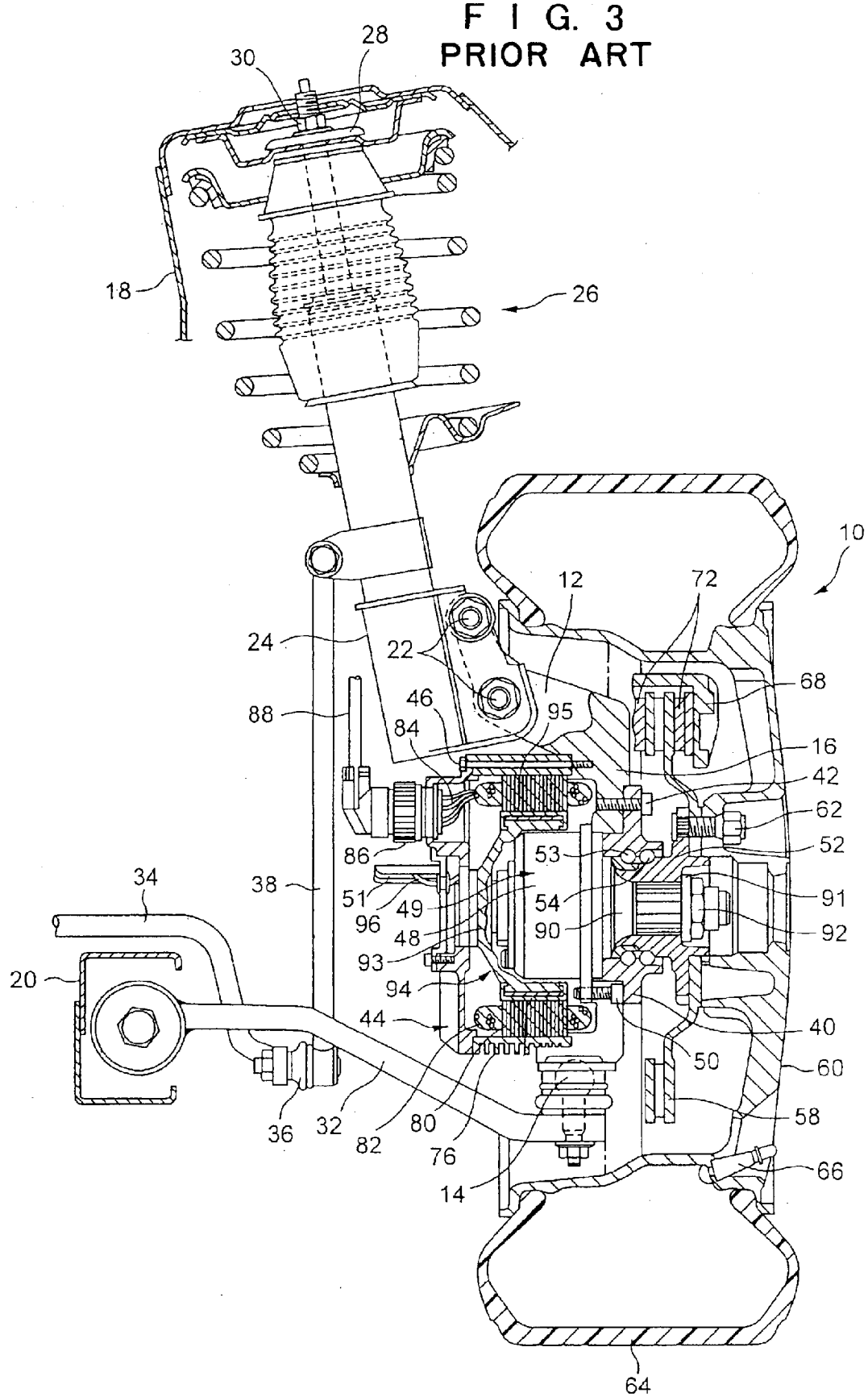
FIG. 3 is a longitudinal sectional view of still another conventional in-wheel motor for an electric vehicle.
Figure 4:
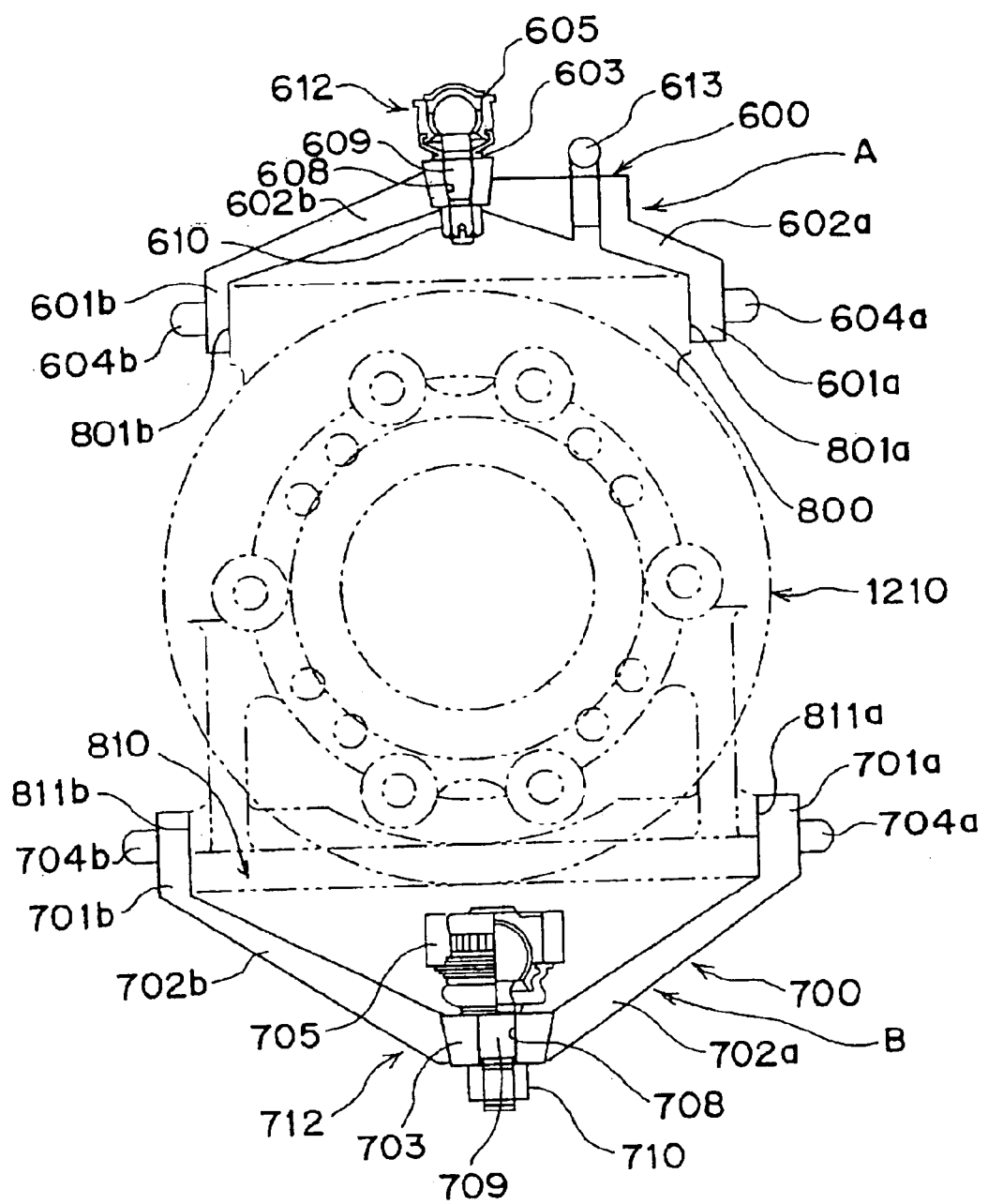
FIG. 4 is a schematic view showing means for mounting an in-wheel motor in a drive system of an electric vehicle to which the present invention is applied.
Figure 5:
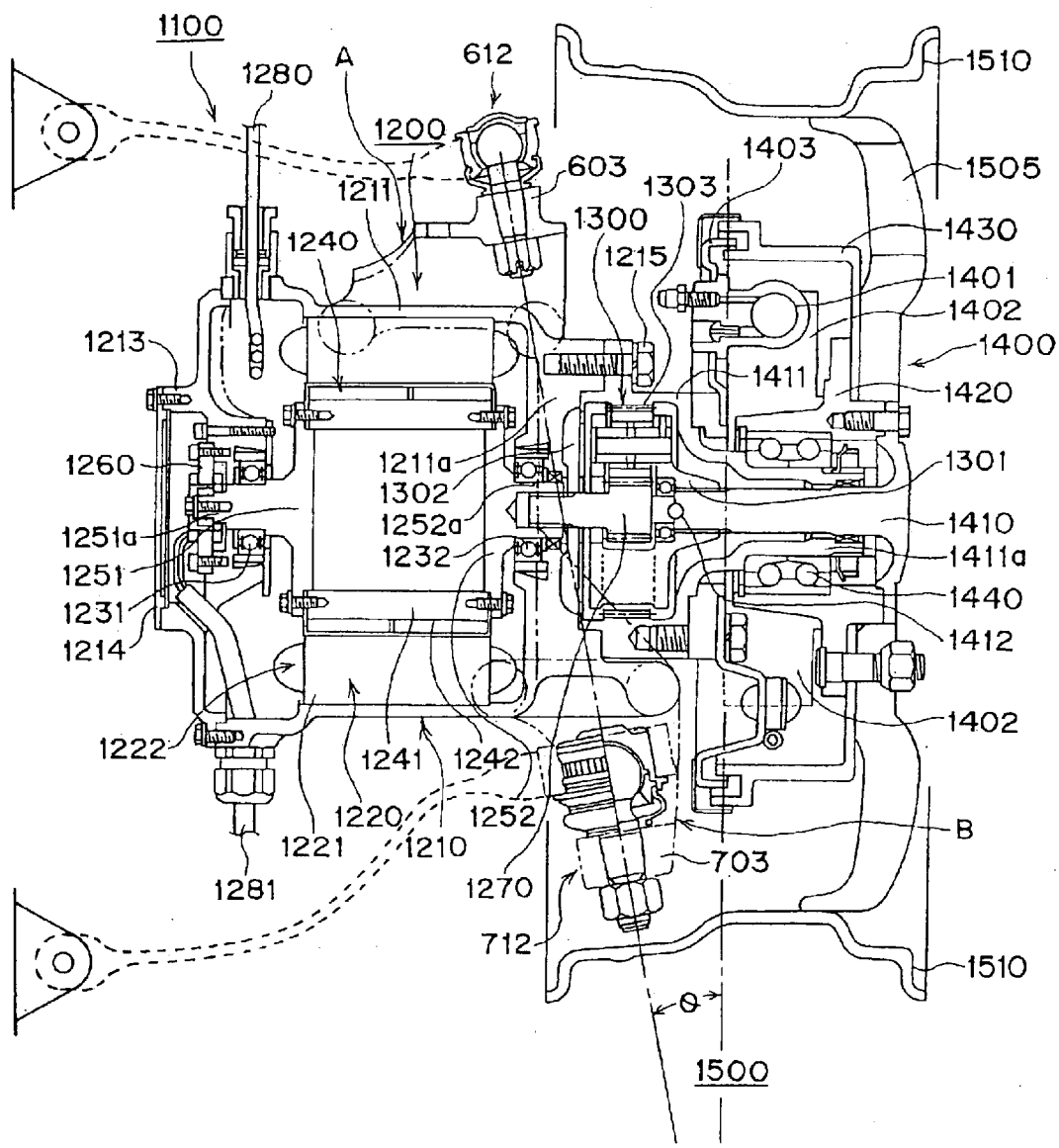
FIG. 5 is a longitudinal sectional view of an in-wheel motor for an electric vehicle of the present invention.

FIG. 4 exemplifies an in-wheel motor of the present invention and means for mounting the in-wheel motor while other structural features are omitted. FIG. 5 is a longitudinal sectional view of the in-wheel motor according to the present invention.

First, the in-wheel motor of the present invention, particularly the inner structure thereof, will be described with reference to FIGS. 4 and 5.

A drive motor 1200 in a drive mechanism 1100 is a permanent-magnet-type AC motor, particularly a 6-phase synchronous AC motor. A casing 1210 of the drive motor 1200 includes an outer frame 1211, an end ring 1213, and an end plate 1214. The outer frame 1211 is cylindrical and includes a bracket portion 1211a, which is located at the right-hand side thereof in FIG. 5. A stator 1220, which is composed of a stator core 1221 and a coil 1222, is mounted on the inner circumferential surface of the outer frame 1211. In order to reduce idle space, the number of poles of the coil 1222 is six, and the coil 1222 uses thin wires. Also, in order to reduce the axial length of the drive motor 1200, coil ends are mechanically compressed from opposite sides. Reference letters A and B denote attachments.

A rotor 1240 includes a rotor core 1241 and a permanent magnet 1242. Rotary shaft blocks 1251 and 1252, which constitute a rotary shaft of the drive motor 1200, are attached to the rotor core 1241 via bolts. A shaft portion 1251a of the rotary shaft block 1251 is supported rotatably by means of a motor bearing 1231, which is fixedly attached to the end ring 1213. A revolution speed detector 1260 such as a resolver is attached to the left-hand end of the shaft portion 1251a. A shaft portion 1252a of the rotary shaft block 1252 is supported rotatably by means of a motor bearing 1232, which is fixedly attached to the bracket portion 1211a of the outer frame 1211. Serrations are formed on the inner surface of the shaft portion 1252a, so that the shaft portion 1252a is spline-coupled to an input shaft 1270 of a reduction gear mechanism 1300.

A housing 1411 houses the reduction gear mechanism 1300. A wheel bearing; i.e., a hub bearing 1440, is fixedly attached to the outer circumference of a wheel shaft tube portion 1411a of the housing 1411. The housing 1411 is attached via bolts 1215 to the bracket portion 1211a of the outer frame 1211 of the drive motor 1200.

AC current is supplied to the coil 1222 of the drive motor 1200 through a cable 1280. A revolution speed signal indicative of revolution speed detected by the revolution speed detector 1260 is output via a cable 1281.

The reduction gear mechanism 1300 is implemented by means of a planetary gear mechanism and adapted to reduce the revolution speed of the input shaft 1270 to thereby transmit the reduced revolution speed to a wheel shaft 1410. A partition 1302 is provided within a gear chamber for controlling stirring of lubrication oil. The planetary gear mechanism may be of a single stage or a plurality of stages.

In this case, a ring gear 1303 of the planetary gear mechanism is provided on the inner surface of the housing 1411. A carrier 1301 is spline-coupled to the wheel shaft 1410 so as to transmit torque to the wheel shaft 1410 while being allowed to move axially. The wheel shaft 1410 is disposed within the wheel shaft tube portion 1411a of the housing 1411.

An end face of the input shaft 1270 and an end face of the wheel shaft 1410 are pivoted by means of a pivot 1412. A brake 1400 is a mechanical drum brake. A back plate 1403 of the brake 1400 is fixedly attached to an end face of the housing 1411. A wheel hub 1420 is attached to the wheel shaft 1410 via bolts. A brake drum 1430 and a disk wheel 1505 of a wheel are attached to the wheel hub 1420 via bolts. A hub bearing 1440 is interposed between the wheel shaft tube portion 1411a and the wheel hub 1420. The brake 1400 operates in the following manner. As hydraulic pressure increases as a result of a brake pedal being stepped on, a wheel cylinder 1401 causes brake shoes 1402 to be expanded, so that the brake shoes 1402 come into contact with the brake drum 1430 for braking.

A tire 1500 is mounted on a rim 1510 of the disk wheel 1505.

In the drive mechanism 1100, when the drive motor 1200 is activated to thereby rotate the rotor 1240, rotation of the rotor 1240 is transmitted to the rotary shaft block 1252 and the input shaft 1270 of the reduction gear mechanism 1300 and is then speed-reduced at the reduction gear mechanism 1300. The speed-reduced rotation is transmitted to the wheel shaft 1410. Thus, the tire 1500 is rotated via the wheel hub 1420 coupled to the wheel shaft 1410, whereby the electric vehicle moves.

Next, an embodiment of means for mounting the in-wheel motor of the present invention will be described with reference to FIG. 4.

An upper mounting block 800 and a lower mounting block 810 are integrally formed on the casing 1210 of the drive motor at an upper portion of the casing 1210 and at a lower portion of the casing 1210, respectively. The upper mounting block 800 is formed on an upper portion of the casing 1210 and assumes a substantially platelike shape. Coupling surfaces 801a and 801b are formed on the corresponding end faces of the substantially platelike mounting block 800, the end faces extending along the longitudinal direction of the casing 1210. A plurality of female screw portions (not shown) are formed on each of the coupling surfaces 801a and 801b.

The lower mounting block 810 is formed on a lower portion of the casing 1210 and assumes a substantially platelike shape. Coupling surfaces 811a and 811b are formed on the corresponding end faces of the substantially platelike mounting block 810, the end faces extending along the longitudinal direction of the casing 1210. A plurality of female screw portions are formed on each of the coupling surfaces 811a and 811b. That is, the upper mounting block 800 has the coupling surfaces 801a and 801b, to which an upper arm 600 is attached, and the lower mounting block 810 has the coupling surfaces 811a and 811b, to which a lower arm 700 is attached.

The shape of the coupling surfaces, the angle of the coupling surfaces with respect to a horizontal plane and the like can be designed arbitrarily. The angles of the coupling surfaces determine the angles of coupling portions 601a and 601b of the upper arm 600, which abut the upper mounting block 800, and the angles of coupling portions 701a and 701b of the lower arm 700, which abut the lower mounting block 810. Reference numerals 604a, 604b, 704a, and 704b denote locking screws to be engaged with female screws formed in the coupling surfaces.

The upper arm 600 includes a support portion 603, arm portions 602a and 602b, and the coupling portions 601a and 601b.

As mentioned above, the coupling portions 601a and 601b are formed so as to abut the coupling surfaces 801a and 801b, respectively, of the upper mounting block 800. The arm portions 602a and 602b are shaped so as to extend between the support portion 603 and the coupling portions 601a and 601b. The shape of the arm portions 602a and 602b must be determined so as to exhibit sufficient strength and rigidity to endure the weight of the vehicle and an impact force transmitted from the wheel to the support portion 603 and a support portion 703, which will be described later.

A ball joint mechanism 612 or a spherical joint mechanism is coupled to the support portion 603.

The ball joint mechanism 612 assumes a known structure. A taper shaft 609 of the ball joint mechanism 612 is inserted into a through-hole 608 formed in the support portion 603 and locked by means of a nut 610. An upper arm of an unillustrated suspension mechanism is attached to a suspension attachment portion 605 of the ball joint mechanism 612.

A coupling 613, to which a steering tie rod is coupled, is provided on the support portion 603 and located away from the through-hole 608. The tie rod coupling 613 may be provided on the lower arm 700, which will be described later.

As shown in FIG. 5, the shaft 609 is inclined at a predetermined angle with respect to the horizontal plane of the support portion 603.

A line that connects the center of rotation of the shaft 609 of the ball joint mechanism 612 and the center of rotation of a shaft 709 of a ball joint mechanism 712, which will be described later, forms a king pin angle $\theta$ with respect to the center axis of a wheel. The king pin angle $\theta$ is determined in view of steering stability of a vehicle and the like.

The lower arm 700 includes a support portion 703, arm portions 702a and 702b, and the coupling portions 701a and 701b. The support portion 703 assumes a flat-plate shape and is disposed horizontally while being located away from the bottom surface of the lower mounting block 810 of the casing 1210.

As mentioned above, the coupling portions 701a and 701b are formed so as to abut the coupling surfaces 811a and 811b, respectively, of the lower mounting block 810. The arm portions 702a and 702b are shaped so as to extend between the support portion 703 and the coupling portions 701a and 701b. As in the case of the arm portions 602a and 602b of the upper arm 600, the shape of the arm portions 702a and 702b must be determined so as to exhibit sufficient strength and rigidity to endure the weight of the vehicle and an impact force transmitted from the wheel to the support portion 703.

The ball joint mechanism 712 assumes a known structure. A taper shaft 709 of the ball joint mechanism 712 is inserted into a through-hole 708 formed in the support portion 703 and locked by means of a nut 710. A suspension attachment portion 705 of the ball joint mechanism 712 is attached to a lower arm of a suspension mechanism (not shown). As shown in FIG. 5, the shaft 709 is inclined at a predetermined angle with respect to the horizontal plane of the support portion 703.

The shaft 709 of the ball joint mechanism 712 is provided such that the axis thereof is aligned with the axis of the shaft 609 of the ball joint mechanism 612. As mentioned above, this alignment feature is employed in view of steering stability of a vehicle and the like.

The present invention is characterized in that:

(1) the upper mounting block 800 having the coupling surfaces 801a and 801b which are common among different types of vehicles and the lower mounting block 810 having the coupling surfaces 811a and 811b which are common among different types of vehicles are formed on the casing 1210 of the drive motor;

(2) the upper arm 600—which includes the coupling portions 601a and 601b which abut the coupling surfaces 801a and 801b which are common among different types of vehicles, the support portion 603 which is coupled to a suspension mechanism, and the arm portions 602a and 602b which extend between the support portion 603 and the coupling portions 601a and 601b—is fixedly attached to the coupling surfaces 801a and 801b of the upper mounting block 800 by use of the locking screws 604a and 604b or the like; and (3) the lower arm 700—which includes the coupling portions 701a and 701b which abut the coupling surfaces 811a and 811b which are common among different types of vehicles, the support portion 703 which is coupled to the suspension mechanism, and the arm portions 702a and 702b which extend between the support portion 703 and the coupling portions 701a and 701b—is fixedly attached to the coupling surfaces 811a and 811b of the lower mounting block 810 by use of the locking screws 704a and 704b or the like.

Also, the present invention is characterized in that, in the in-wheel motor described above in (1), (2), and (3), the support portions 603 and 703 of the arms 600 and 700 are coupled to the suspension mechanism via the ball joint mechanisms 612 and 712 or respective spherical joint mechanisms.

Further, the present invention is characterized in that the ring gear 1303 of the reduction gear mechanism 1300, which reduces the revolution speed of the drive motor and transmits the reduced revolution speed to the wheel, is formed on the inner surface of the housing 1411, which is a member separate from the motor casing 1210; the input shaft 1270 of the reduction gear mechanism 1300 is spline-coupled to the shaft portion 1252a of the drive motor; and the housing 1411 is removably attached to the casing 1210 via bolts.

The present invention is not limited to the above-described embodiments. Numerous modifications and variations of the present invention are possible in light of the spirit of the present invention, and they are not excluded from the scope of the present invention.

As described above, the present invention yields the following effects.

(A) Only the upper and lower mounting blocks are formed on an in-wheel motor body such that coupling surfaces of the blocks are common among different types of vehicles. A plurality of types of upper and lower arms are prepared such that, while coupling specifications are common among the upper arms and among the lower arms, other specifications of the upper and lower arms are modified according to, for example, mounting height. An upper arm and a lower arm are selected from the prepared upper and lower arms as appropriate for individual applications. The upper and lower mounting blocks are coupled to a suspension mechanism by means of the thus-selected upper and lower arms.

Conventional motor mounting means is integral with a motor casing; thus, mounting position, mounting height, etc. are fixed. Therefore, replacement with a drive motor of a different type is difficult unless the replacing drive motor has the same mounting dimensions as those of a drive motor to be replaced. By contrast, according to the present invention, the attachment, which serves as motor mounting means, and the casing are discrete members. Therefore, even when a replacing drive motor is of a different type, the replacing drive motor can be mounted by means of changing attachments.

(B) The present invention allows a wheel drive section including a speed reduction mechanism to be separated from a drive motor. Therefore, through change in the gear ratio of a reduction gear apparatus, the revolution speed of a wheel and driving torque can be changed, whereby tire diameter can be selected freely without need to replace a drive motor.

INDUSTRIAL APPLICABILITY

The in-wheel motor of the present invention can cope with changes in specifications and performance of a vehicle through replacement of units and is favorably used in an electric vehicle.

What is claimed is:

1. An in-wheel motor for an electric vehicle comprising a drive motor, a reduction gear mechanism, a wheel bearing, and a mechanical brake and serving as a drive apparatus for an electric vehicle, said in-wheel motor being characterized in that said drive motor includes a casing which houses a rotor and a stator;

said reduction gear mechanism comprises a planetary gear mechanism;

a wheel bearing is fixedly attached to an outer circumference of an end portion of a housing, which houses a wheel shaft coupled to an output element of said planetary gear mechanism;

said housing houses said planetary gear mechanism therein and is attached to said casing via bolts;

mounting blocks having engagement means are provided respectively at upper and lower outside portions of said casing; and attachments are attached to said corresponding mounting blocks and joined to corresponding joint mechanisms, which are movably coupled to a suspension mechanism.

2. An in-wheel motor for an electric vehicle as described in claim 1, wherein said attachments are characterized in that a line connecting centers of rotation of said joint mechanisms, which are fixedly attached to said corresponding attachments, forms a king pin angle with respect to a center axis of a wheel.

3. An in-wheel motor for an electric vehicle as described in claim 1, wherein a steering tie rod is coupled to either of said attachments.

4. An in-wheel motor for an electric vehicle as described in claim 1, wherein a rotational-position detector is disposed on a side of said rotor opposite an output side of said rotor, and said rotational-position detector is a resolver.

5. An in-wheel motor for an electric vehicle as described in claim 1, wherein said drive motor is a 6-phase synchronous AC motor.

6. An in-wheel motor for an electric vehicle as described in claim 1, wherein coil ends of an armature, which partially constitutes said stator, are mechanically compressed from axially opposite sides.

7. An in-wheel motor for an electric vehicle as described in claim 1, wherein said joint mechanism is a ball joint mechanism or a spherical joint mechanism.

8. An in-wheel motor for an electric vehicle comprising a drive motor, a reduction gear mechanism, a wheel bearing, and a mechanical brake and serving as a drive apparatus for an electric vehicle, said in-wheel motor being characterized in that said drive motor includes a casing which houses a rotor and a stator;

said reduction gear mechanism comprises a planetary gear mechanism;

a wheel bearing is fixedly attached to an outer circumference of an end portion of a housing, which houses a wheel shaft coupled to an output element of said planetary gear mechanism;

said mechanical brake is a drum brake or a disk brake;

said planetary gear mechanism is housed within said housing, and an input shaft of said planetary gear mechanism is spline-coupled to a rotary shaft of said drive motor; and said housing is attached to said casing via bolts.

9. An in-wheel motor for an electric vehicle as described in claim 8, wherein said planetary gear mechanism is configured such that a partition is provided within a gear chamber for controlling stirring of lubrication oil.

10. An in-wheel motor for an electric vehicle as described in claim 8, wherein a rotational-position detector is disposed on a side of said rotor opposite an output side of said rotor, and said rotational-position detector is a resolver.

11. An in-wheel motor for an electric vehicle as described in claim 8, wherein said drive motor is a 6-phase synchronous AC motor.

12. An in-wheel motor for an electric vehicle as described in claims 8, wherein coil ends of an armature, which partial constitutes said stator, are mechanically compressed from axially opposite sides.

* * * * *